United States Patent
Adler et al.

(10) Patent No.: US 9,975,496 B2
(45) Date of Patent: May 22, 2018

(54) LOAD RECEPTACLE

(71) Applicant: Thule Sweden AB, Hillerstorp (SE)

(72) Inventors: Jan Adler, Skillingaryd (SE); Anders Nilvius, Värnamo (SE); Torbjörn Oxelborn, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days. days.

(21) Appl. No.: 15/196,607

(22) Filed: Jun. 29, 2016

(65) Prior Publication Data

US 2017/0001574 A1    Jan. 5, 2017

(30) Foreign Application Priority Data

Jul. 2, 2015  (EP) ..................... 15174973

(51) Int. Cl.
*B60R 9/10* (2006.01)
*B60R 9/06* (2006.01)

(52) U.S. Cl.
CPC ................ *B60R 9/10* (2013.01); *B60R 9/065* (2013.01)

(58) Field of Classification Search
CPC ............ B60R 9/10; B60R 9/055; B60R 9/065
USPC .......... 70/63; 109/52; 410/110, 111; 224/583
See application file for complete search history.

(56) References Cited

U.S. PATENT DOCUMENTS

| | | | | |
|---|---|---|---|---|
| 3,000,418 A | * | 9/1961 | Bitting .................... | B60R 9/048 180/53.8 |
| 3,912,098 A | * | 10/1975 | Nicotra ................... | B60R 9/065 224/521 |
| 4,727,630 A | * | 3/1988 | Alan ....................... | A44B 11/06 24/593.11 |
| 4,974,765 A | * | 12/1990 | Marchetto ................. | B62J 7/02 224/275 |
| 5,096,107 A | * | 3/1992 | VanSon ................... | B60R 9/055 224/309 |
| 5,219,423 A | * | 6/1993 | Kamaya ............... | A45C 7/0086 190/108 |
| 5,228,608 A | | 7/1993 | Stout, III | |
| 5,267,679 A | * | 12/1993 | Kamaya ............... | A45C 7/0086 190/102 |
| 5,288,003 A | * | 2/1994 | MacDonald ............ | B60R 9/055 224/311 |

(Continued)

FOREIGN PATENT DOCUMENTS

| | | |
|---|---|---|
| DE | 20 2009 012576 | 12/2009 |
| DE | 10 2010 024956 | 12/2011 |
| EP | 2 703 224 | 3/2014 |

OTHER PUBLICATIONS

European Search Report for European Application No. EP 15174973.6, European Patent Office, Munich, Germany, dated Dec. 15, 2015, 7 pages.

*Primary Examiner* — Justin Larson
(74) *Attorney, Agent, or Firm* — Sterne, Kessler, Goldstein & Fox P.L.L.C.

(57) ABSTRACT

A load receptacle is mountable on a load carrier fixed to the rear of a vehicle. The load receptacle includes a load receptacle fastening member configured to cooperate with an available counterpart of the load carrier. The load receptacle fastening member includes one of an elongate member and a receiving member of a fastening structure. The elongate member is a toothed strap made of synthetic material. The receiving member is configured to detachably receive the elongate member.

26 Claims, 4 Drawing Sheets

(56) References Cited

U.S. PATENT DOCUMENTS

| | | | | |
|---|---|---|---|---|
| 5,460,304 A * | 10/1995 | Porter | B60R 9/06 | 224/485 |
| 5,538,169 A * | 7/1996 | Moore | B60R 9/055 | 190/109 |
| 5,573,162 A | 11/1996 | Spencer et al. | | |
| 5,775,560 A * | 7/1998 | Zahn | B60R 9/06 | 224/485 |
| 5,862,966 A * | 1/1999 | Mehls | B60R 9/06 | 224/504 |
| 6,085,686 A * | 7/2000 | Hemmingson | B63B 25/002 | 114/343 |
| 6,244,482 B1 * | 6/2001 | Gyarmaty | B60R 9/055 | 224/318 |
| 6,299,042 B1 * | 10/2001 | Smith | B62J 7/04 | 224/413 |
| 6,422,442 B1 * | 7/2002 | McDaid | B62H 5/00 | 224/441 |
| 6,561,398 B1 * | 5/2003 | Cole | B60R 9/048 | 224/324 |
| 6,601,712 B2 * | 8/2003 | Dean | B60R 9/048 | 211/17 |
| 6,892,912 B1 * | 5/2005 | MacNeil | B60R 9/055 | 224/318 |
| 7,896,207 B1 * | 3/2011 | Latham | A45F 4/02 | 224/416 |
| 7,913,959 B2 * | 3/2011 | White | A61C 17/04 | 248/314 |
| 8,505,793 B2 * | 8/2013 | Foley | B60R 9/048 | 224/315 |
| 8,820,598 B2 * | 9/2014 | Tennyson | B60R 9/06 | 224/509 |
| 2003/0047576 A1 | 3/2003 | Babbitt et al. | | |
| 2004/0099703 A1 | 5/2004 | Schoenberger | | |
| 2006/0261111 A1 * | 11/2006 | McCoy | B60R 9/065 | 224/499 |
| 2006/0292915 A1 * | 12/2006 | Bogoslofski | B60R 9/065 | 439/352 |
| 2008/0142559 A1 * | 6/2008 | Lim | B60R 9/06 | 224/489 |
| 2010/0176169 A1 | 7/2010 | Lovett | | |
| 2011/0024471 A1 * | 2/2011 | Golenz | B60R 9/055 | 224/314 |
| 2012/0085609 A1 * | 4/2012 | Ostrow | A45C 5/14 | 190/18 A |
| 2012/0168473 A1 * | 7/2012 | Arajakis | A45F 5/00 | 224/250 |
| 2014/0339275 A1 * | 11/2014 | Krikorian | A45F 3/08 | 224/153 |
| 2017/0001574 A1 * | 1/2017 | Adler | B60R 9/065 | |

* cited by examiner

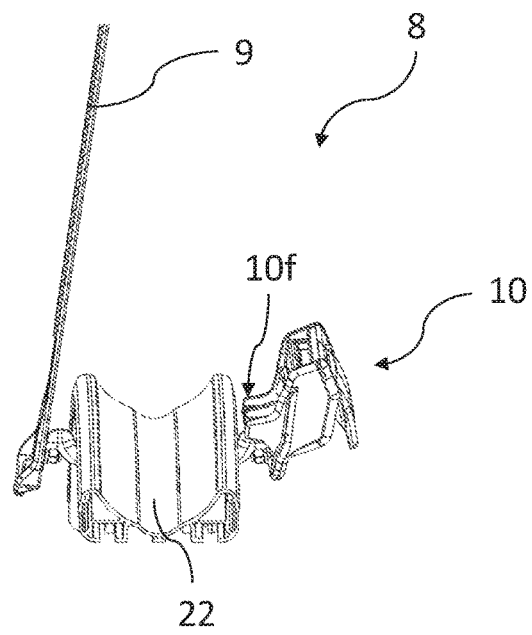
FIG. 6
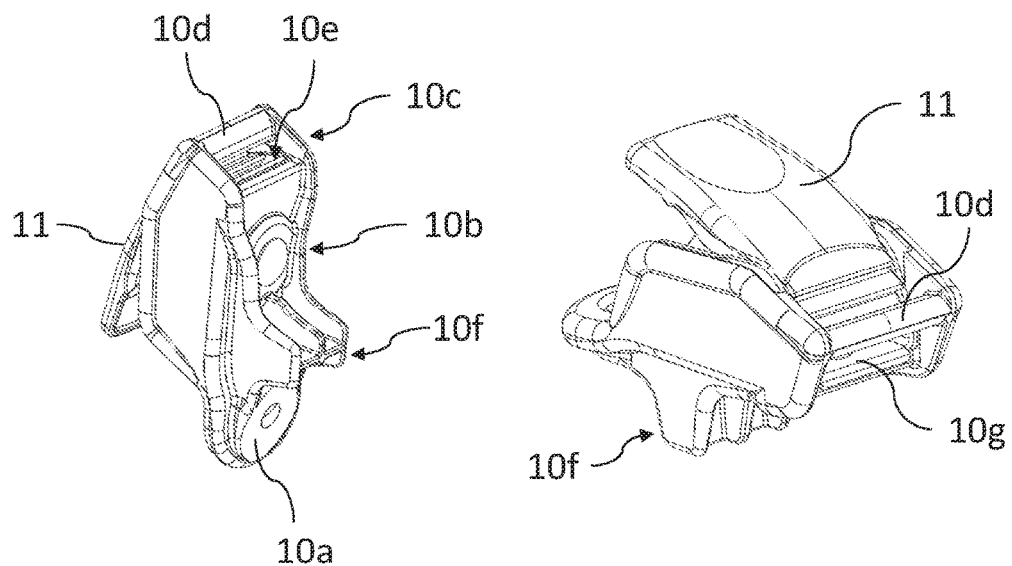
FIG. 7A
FIG. 7B

LOAD RECEPTACLE

FIELD

The present invention relates to a load receptacle mountable on a load carrier fixed to the wheel of a vehicle as well as to a load carrier system comprising such a load receptacle and a load carrier.

BACKGROUND

Load carriers in particular of the kind fixed to the wheel of a vehicle have become increasingly popular. Known load carriers typically comprise a designated function such as carrying bikes. In other words, the load carriers are typically designed for a specific purpose. On the other hand, load carrier systems are known in which a base part is mountable on the rear of a vehicle and different types of carrier elements designed for a specific purpose are mountable on that base part. Such a configuration allows to change the purpose of the overall load carrier system by interchanging carrier elements and mounting them on the base part. For instance, it is possible in such systems to mount a bike carrier element on the base part and in case additional storage space is necessary, to mount a corresponding carrier box on the base part. As the latter systems are typically more costly, there exists the need to provide an interchangeability of functions of load carriers fixed to the rear of a vehicle. In this connection, systems are available which allow to place and mount a bag or load receptacle on an existing load carrier. For example, there are systems available in which the load carrier is a bike carrier and a load receptacle is mounted on the bike carrier.

BRIEF SUMMARY

In view of the above background, it is the object of the present subject matter to provide a load receptacle mountable on a load carrier fixed to the rear of a vehicle with an increased mountability.

Furthermore, it is object of the invention to provide a load carrier system comprising such a load receptacle as well as a load carrier.

The object is solved by a load receptacle and a load carrier system as described below.

According to the invention, a load receptacle mountable on a load carrier fixed to the rear of a vehicle is provided, wherein the load receptacle comprises a load receptacle fastening member adapted to cooperate with an available counterpart of the load carrier. The load receptacle fastening member can include one of an elongate member and a receiving member of a fastening structure, wherein the elongate member is preferably a toothed strap made of synthetic material and wherein the receiving member is adapted to detachable receive the elongate member wherein the receiving member is preferably a strap receiver comprising a pump buckle. The strap can also be made of a fabric.

Accordingly, a load receptacle mountable on a load carrier fixed to the rear of a vehicle is provided. The load receptacle comprises a load receptacle fastening member adapted to cooperate with an available counterpart of the load carrier. Such an available counterpart can be a part of the load carrier which is already present on the load carrier or can be a part which is fixed on the load carrier so as to serve as the available counterpart of the load receptacle fastening member.

The load receptacle fastening member can include one of an elongate member and a receiving member of a fastening structure. Accordingly, the connection between the load receptacle and the load carrier is provided by a fastening structure including an elongate member and a receiving member. The load receptacle fastening member can include one of the latter elements of the fastening structure. Hence, the load receptacle fasting member can be the elongate member or the receiving member. The available counterpart as described before is adapted to cooperate with the load receptacle fasting member. Accordingly, in case the load receptacle fasting member is an elongate member, the available counterpart is adapted to receive the elongate member. On the other hand, in case the load receptacle fasting member is a receiving member, the available counterpart is structured as an elongate member to be received by the receiving member. Accordingly, the available counterpart can be one of the receiving member and the elongate member of the fastening structure depending on the kind of load receptacle fasting member.

Preferably, the elongate member is a toothed strap made of a synthetic material such as plastics. Furthermore, the receiving member is adapted to detachably receive the elongate member. Different possibilities are available for providing a detachable connection between the receiving member and the elongate member including a latching connection, a frictional connection or a clamp connection for instance. Preferably, the receiving member is a strap receiver comprising a pump buckle. In such a configuration, the pump buckle can comprise teeth which upon actuation of the pump buckle engage with teeth provided in the elongate member such that the elongate member is moved with respect to the strap receiver thereby tensioning the elongate member.

Advantageously, the available counterpart has a designated function other than cooperating with the load receptacle fastening member. In other words, the available counterpart can be an existing part of the load carrier which is normally used for a different purpose on the load carrier. As an example, the designated function can be the attachment of different parts to the load carrier by using the available counterpart. Preferably, the designated function of the available counterpart is only available in a condition in which the load receptacle is not mounted on the load carrier. For instance, the designated function of the available counterpart can be a cooperation with a further member of the load carrier in order to fix an element on the load carrier. In case the available counterpart is used for fixing the load receptacle on the load carrier, the available counterpart is no longer available for the previous function of cooperating with the further element of the load carrier. Thus, in case the load receptacle is mounted on the load carrier, the initial function of the available counterpart on the load carrier is suppressed.

Preferably, the load receptacle further comprises a locking mechanism for temporarily suppressing a detachability of the elongate member from the receiving member. Consequently, by using such a locking mechanism, an anti-theft protection is provided in order to prevent a disengagement of the elongate member from the receiving member. Accordingly, the load receptacle can be locked on the load carrier. The receiving member can be adapted to receive the elongate member by passing a portion of the elongate member through the same. Accordingly, the receiving member can provide an opening through which the elongate member can passed. The locking mechanism can comprise a stop element non-moveably mountable on the elongate member upon completion of passing the elongate member through the receiving member, for blocking a passing of the elongate member through the receiving member in a direction opposite to the insertion direction.

Different configurations are possible. For example, after the elongate member has passed a receiving member, a free end of the elongate member protrudes from one side of receiving member in the insertion direction. The stop element can be provided on the free end protruding from the receiving member and can have a dimension which does not allow a passing of the stop element through a receiving member thereby preventing a releasement of the elongate member from the receiving member. The stop element can comprise two portions hingedly coupled to each other and being able to sandwich a portion of the elongate member between them. Furthermore, the stop element can comprise a locking section lockably coupling the free ends of the two portions of the stop element to each other. With such a configuration of the stop element, it is possible to bring the portions of the stop element into a state, in which it is possible to sandwich a portion of the elongate member between the same and to lock the free ends of the portions of the stop element to each other such that the stop element completely surrounds the elongate member and is fixedly mounted thereto. In order to non-moveably mount the stop element on the elongate member, different configurations of the stop element are possible. For example, in case the elongate member is a toothed strap, it is possible to provide one of the portions of the stop element with teeth corresponding to the teeth provided on the elongate member. Accordingly, in case a stop element configured in this way is mounted on a toothed strap, the teeth will engage with each other and a movement in the longitudinal direction of the toothed strap is prevented.

If the stop element is mounted on the free end of the elongate member as described above, the stop element serves as an abutment element which can get into contact with the receiving member in case an attempt is made to remove the elongate member from the receiving member in the direction opposite to the insertion direction. As soon as the stop element gets in contact with a receiving member, a movement of the elongate member is blocked.

It is also possible to connect the abutment element with the receiving member in such a way that the stop element can be moved towards and away from the elongate member. Such a configuration has the advantage that the stop element is not provided as separate part. For example, it is possible to hingedly couple the stop element to the receiving member. Furthermore, it is also possible to provide a configuration in which the stop element has a fixed position with respect to the receiving member meaning that a movement of the elongate member with respect to the receiving member is prevented as soon as the stop element is coupled to the elongate member.

Preferably, at least one receptacle fastening member, preferably two fastening members, is/are arranged on a back portion of the load receptacle wherein the back portion faces away from the vehicle when the load receptacle is mounted on the load carrier. Accordingly, it is possible to use a single receptacle fastening member on the back portion of the load receptacle or multiple fastening members.

Furthermore, the load receptacle can comprise at least one load receptacle fastening element, preferably two load receptacle fastening elements arranged on a front portion of the load receptacle facing towards the vehicle when the load receptacle is mounted on the load carrier. The load receptacle fastening element can be load receptacle fastening member as described above or can be a different element for fastening the load receptacle to the load carrier.

Preferably, the load receptacle fastening element comprises a protrusion protruding from a front portion of the load receptacle, wherein the front portion faces towards the vehicle when the load receptacle is mounted on the load carrier, wherein the protrusion is insertable into a corresponding recess formed in the load carrier. Such a configuration enhances the mountability of the load receptacle on the load carrier in that the coupling of the load receptacle on the front side is accomplished by an engagement of a protrusion in a recess. In case the protrusion and the recess are sufficiently dimensioned, it is even possible to omit further fastening members on the front portion of the load receptacle. In this case, the mountability is even more enhanced as further mounting steps are only to be performed on the back side of the load receptacle which is easier accessible compared to the front side which faces the vehicle.

Advantageously, the load receptacle is one of a basket, a hardshell box a soft case or a carrier comprising a hardshell base with a soft upper part. Accordingly, the load receptacle can be realized in the form of different configurations allowing the transportation of loads different to the loads which are usually carried on the load carrier on which the load receptacle is mounted.

According to a further aspect of the present subject matter, a load carrier system is provided comprising a load receptacle as described above and a load carrier mountable on a rear mount system of a vehicle, preferably a ball hitch or a fix point attachment of the vehicle. Preferably, the load carrier is bike carrier.

In a preferred configuration, the load carrier is bike carrier comprising a wheel tray for supporting a wheel of a bike as well as a wheel securing device comprising a wheel tray strap and a wheel tray strap receiver for fixing a wheel of a bike on the wheel tray. At least one element of the wheel securing device can form an available counterpart and the load receptacle fastening member can be adapted to cooperate with at least one of the wheel tray strap and the wheel tray strap receiver.

Preferably, the wheel tray strap receiver comprises a mounting section for mounting the wheel tray strap receiver on one side of a wheel tray and an engaging section into which an end of the wheel tray strap is insertable wherein the mounting section and the engaging section can be flexibly coupled to allow a movement of the engaging section about the mounting section.

Different configurations are available for providing the flexible coupling as described before. For example, the mounting section and the engaging section can be hingedly coupled to each other. Preferably, the wheel tray strap receiver is at least partially made of flexible material allowing the engaging section to flex about the mounting section. In other words, at least a portion of the wheel strap receiver between the mounting section and the engaging section is formed flexible. By flexibly coupling the engaging section and the mounting section in the above way, the wheel tray strap receiver can adapt itself to the objects mounted on the bike carrier. For example, the wheel tray strap receiver can adapt to the wheel size of the bike to be transported on the bike carrier and also allows a transportation of a fatbike having an increased wheel dimension. Furthermore, the mountability of a load receptacle on the bike carrier is also enhanced in that it is possible to orient the engaging section by pulling it towards the user such that it is possible to easily insert a free end of an elongate member therein.

Preferably, the wheel strap receiver further comprises a guiding portion arranged adjacent to the engaging section wherein the guiding portion comprises an insertion slot for inserting and guiding a toothed strap.

Preferably, the wheel tray strap receiver comprises an abutment portion adapted to contact the wheel tray on one side allowing a movement of the engaging section towards the wheel tray until the abutment portion contacts the wheel tray and preventing a further movement of the engaging section towards the wheel tray when the abutment portion is in contact with the wheel tray. Accordingly, the wheel tray strap receiver is designed to avoid a contact between the wheel tray strap receiver and the wheel of a bike mounted on the wheel tray of the bike carrier. This is achieved by a configuration in which the wheel tray strap receiver is moveable towards the wheel tray to a certain extent, namely until the abutment portion contacts the wheel tray.

Advantageously, the load receptacle comprises recesses for accommodating the wheel trays. In other words, the lower portion of the load receptacle can be adapted to the structure of the load carrier on which it is to be mounted. In case the load carrier is a bike carrier, the bottom portion of the load receptacle is preferably designed such that the wheel trays can be accommodated in corresponding recesses.

Since the load receptacle is securely attached to the load carrier, tilting the load carrier as widely implemented in load carriers for enabling an access to the trunk of a vehicle is possible with the load receptacle mounted on the load carrier.

It is to be noted that the above described wheel tray strap receiver as described in connection with the bike carrier, can also be suitably used as strap receiver on other devices than bike carriers. Furthermore, the locking mechanism as described above can be generally used on fastening structures including a strap and a strap receiver through which the strap is passed. The subject matter shall not be limited to the combined use of any of the latter elements with a load receptacle or a load carrier.

BRIEF DESCRIPTION OF THE DRAWINGS

FIG. 6 shows the configuration of a wheel securing device according to the present subject matter; and FIGS. 7A and 7B show perspective views of a wheel tray strap receiver according to the present subject matter.

DETAILED DESCRIPTION

Figure 1:
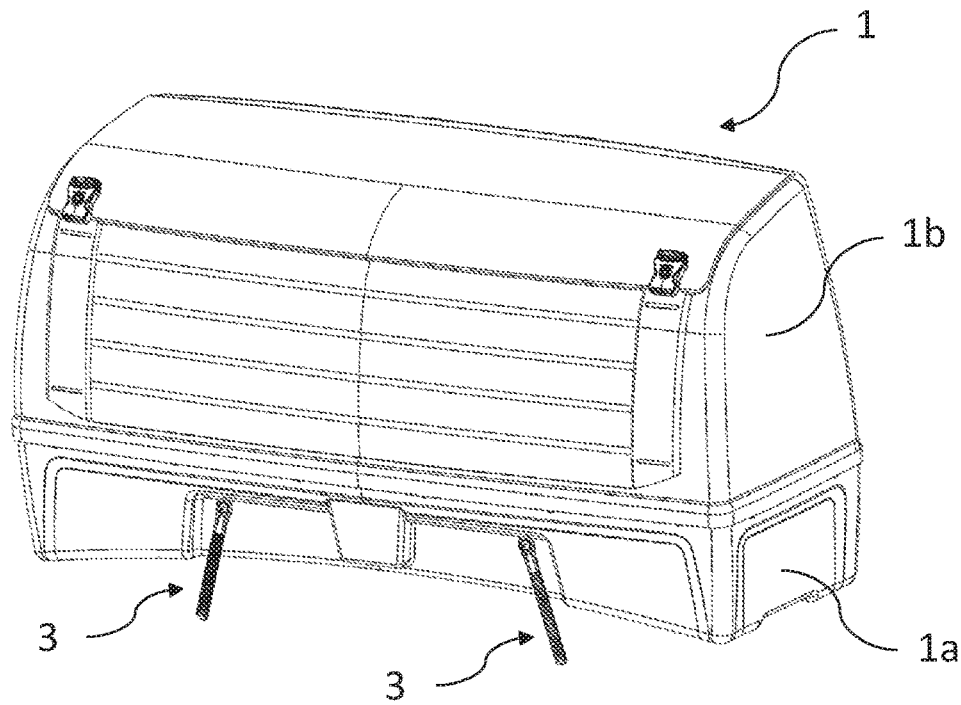
FIG. 1 shows a perspective back side view of a load receptacle according to an embodiment of the present subject matter.

In the following, an embodiment as well as modifications of the present subject matter will be described with reference to the drawings. It is to be noted that similar elements in the drawings are denoted with the same reference signs.

Figure 2:
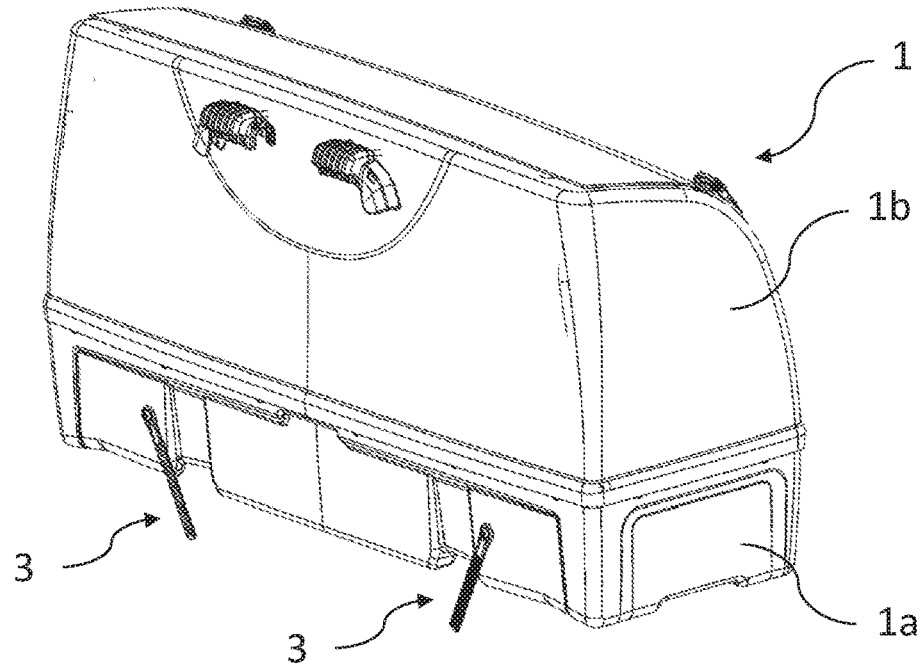
FIG. 2 shows a perspective front side view of the load receptacle shown in FIG. 2.

A load receptacle 1 according to an embodiment of the present subject matter is shown in FIGS. 1 and 2. More precisely, FIG. 1 shows a back side view of the load receptacle 1 and FIG. 2 shows a front side view of the load receptacle 1.

The load receptacle 1 according to the present embodiment comprises a lower portion 1a which is made of a rather rigid material so as to provide a suitable supporting basis allowing a suitable support against a load carrier and also being able to withstand the loads of goods to be transported in the load receptacle 1. In the embodiment as shown in FIGS. 1 and 2, the lower portion 1a comprises a trough shaped opening which is open in the upward direction. On the upper end of the lower portion 1a a cover portion 1b is provided which can be made of a flexible material, a waterproof fabric for instance, which is supported by a frame construction coupled to the lower portion 1a. As is also shown in FIGS. 1 and 2, load receptacle fastening members 3 in the form of toothed straps are mounted on the back side and the front side of the load receptacle at a predetermined distance from each other and at positions allowing a cooperation of the load receptacle fastening members with an available counterpart of a load carrier on which the load receptacle is to be mounted.

Figure 3:
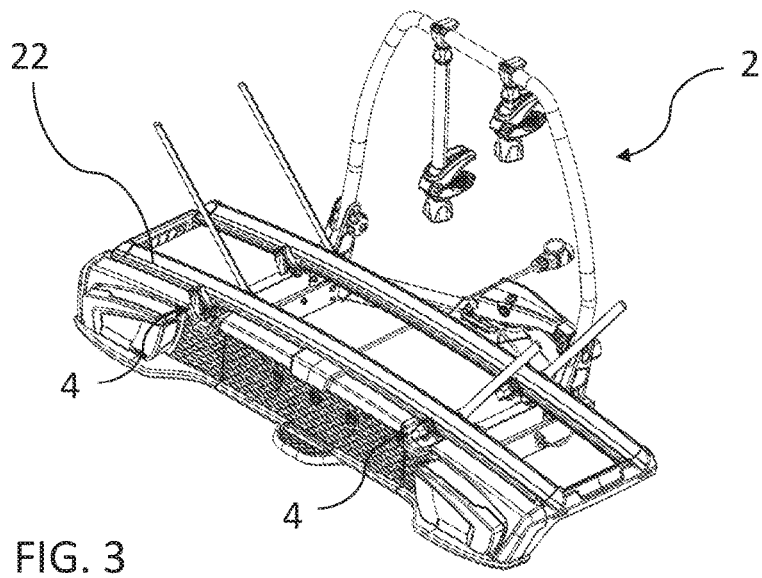
FIG. 3 shows a perspective view of a bike carrier.

According to the present subject matter, the load carrier on which the load receptacle as described with respect to FIGS. 1 and 2 is to be mounted is a bike carrier 2 as shown in FIG. 3. The bike carrier 2 comprises two wheel trays 22 and furthermore counterparts 4 to which the load receptacle fastening members 3 of the load receptacle 1 can be coupled. In FIG. 3, only the counterparts provided on the back side of the bike carrier are shown.

Figure 4:
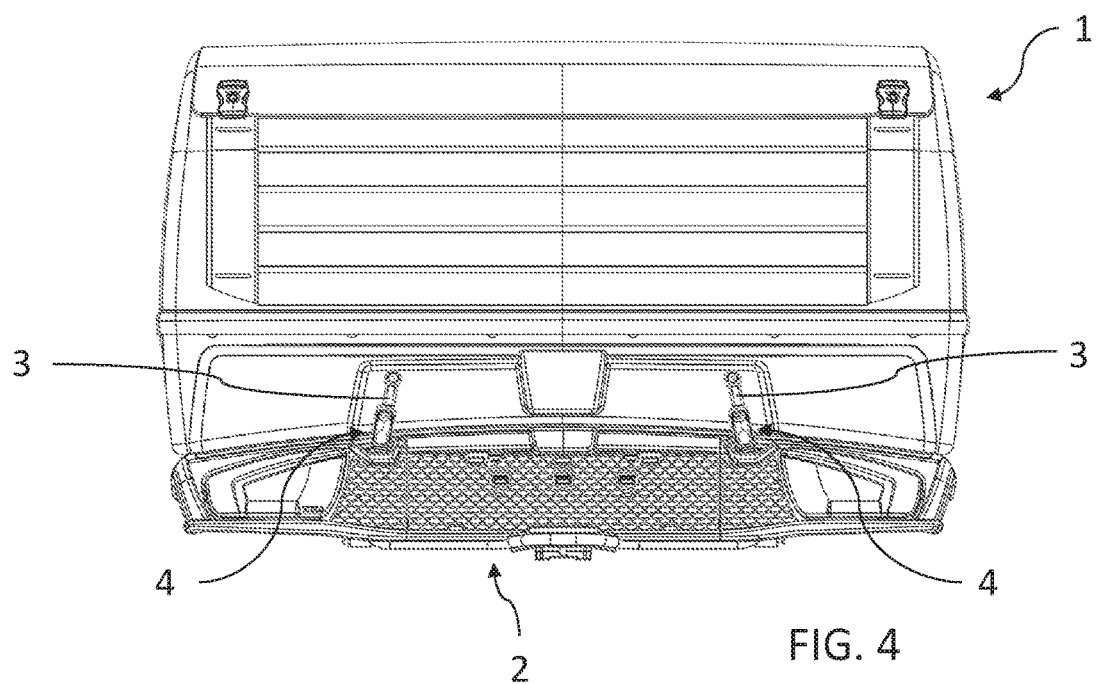
FIG. 4 shows a back side view of a load carrier system in which a load receptacle is mounted on a bike carrier.

FIG. 4 shows a state in which the load receptacle 1 is mounted on the bike carrier 2. As is shown in FIG. 4, the load receptacle fastening members 3 on the back side of the load receptacle 1 are inserted in the available counterparts of the bike carrier 2.

Figure 5:
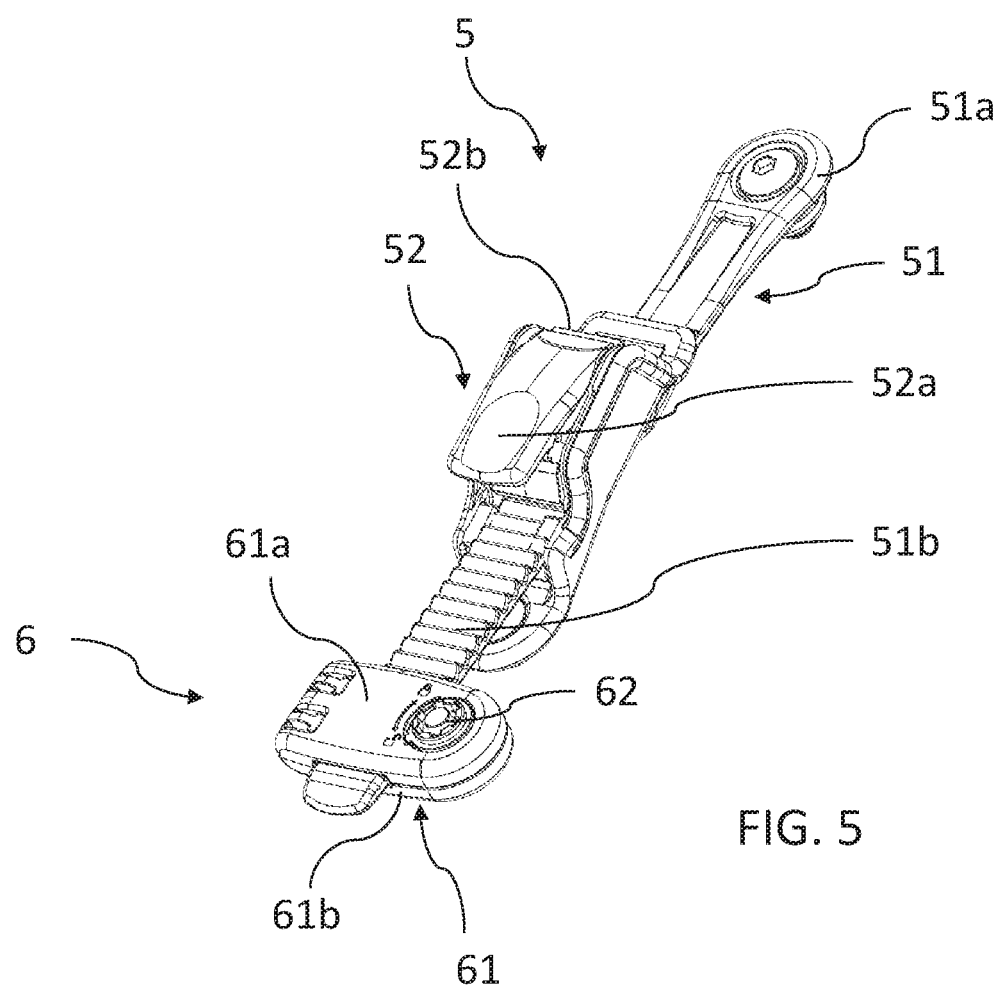
FIG. 5 shows a fastening structure according to the present subject matter.

FIG. 5 shows a general construction of a fastening structure 5 which can be used for fixing the load receptacle 1 to the bike carrier 2. The fastening structure 5 comprises an elongate member 51 and a receiving member 52 comprising a pump buckle 52a in the present embodiment. The elongate member 51 is a toothed strap having a mounting portion 51a and a toothed portion 51b. The receiving member 52 is a pump buckle receiving member in which the pump buckle 52a comprises a toothed section 52b, the teeth of which being engageable with the toothed portion 51b of the elongate member 51. By a rotational movement of the pump buckle 52a, it is possible to effect a movement of the elongate member 51 with respect to the receiving member 52. Furthermore, the pump buckle 52a is arranged in the receiving member 52 such that it can be pushed for releasing an engagement of the teeth provided on the pump buckle 52a from the elongate member 51 allowing a movement of the elongate member 51 in a releasing direction.

Also shown in FIG. 5 is a locking mechanism 6 which is generally useable in connection with fastening structures similar to the one described before. As is shown in FIG. 5, the locking mechanism 6 comprises a stop element 61 comprising two portions 61a and 61b hingedly coupled to each other at one side, the left side in FIG. 5, and lockably connectable to each other on the other side, the right side in FIG. 5, by means of a locking element 62. Accordingly, the locking mechanism 6 as shown in FIG. 5 is shown in a locked state. The stop element 61 is non-moveably mounted on the toothed portion 51b of the elongate member 51. In order to provide a fixed connection preventing a movement of the stop element 61 with respect to the elongate member 51, an inner portion of the upper portion 61a of the stop element 61 which faces the teeth provided on the elongate member 51 is formed with corresponding teeth engageable with the teeth of the elongate member 51 such that a movement of the stop element 61 with respect to the elongate member 51 is inhibited as soon as the upper portion 61a and the lower portion 61b are locked with each other by the locking element 62.

As is further shown in FIG. 5, the stop element 61 comprises a dimension which does not allow passing the same through the receiving member 52. Accordingly, in case the pump buckle 52a is pushed in order to release the engagement of the pump buckle 52a with the elongate member 51, a movement of the elongate member 51 is only possible until the stop element 61 gets in contact with the receiving member 52. Consequently, the locking mechanism 6 securely prevents the releasing of the elongate member 51 from the receiving member 52. Accordingly, in case the above described fastening structure 5 is used for connecting the load receptacle 1 to a bike carrier 2 or another load carrier, using the locking mechanism 6 provides an anti-theft protection for the load receptacle 1.

FIG. 6 shows a wheel securing device 8 as used for the wheel trays 22 of the bike carrier 2. The wheel securing device 8 functions according to the principle as described with respect to the fastening structure 5 shown in FIG. 5. In other words, similar to the fastening structure 5 as described with respect to FIG. 5, the wheel securing device comprises a wheel tray strap 9 corresponding to an elongate member and a wheel tray strap receiver 10 corresponding to a receiving member. As is shown in FIG. 6, an end of the wheel tray strap 9 is mounted on one side of the wheel tray 22 and the wheel tray strap receiver 10 is mounted on an opposite side of the wheel tray 22. Furthermore, both elements are arranged such that it is possible to insert an end portion of the wheel tray strap 9 into the wheel tray strap receiver 10.

In practical use, the wheel securing device 8 functions in the following manner. As soon as a bike is placed on the bike carrier 2 by supporting the wheels of the bike on the wheel tray 22, the wheel tray strap is passed between spokes of a wheel of the bike and inserted into the wheel tray strap receiver thereby forming a fixation loop which can be tensioned by the operation of a pump buckle 11 of the wheel tray strap receiver 10.

The wheel tray strap receiver 10 can be used for each bike carrier using wheel trays for supporting the wheels of a bike. For that purpose, the wheel tray strap receiver 10 comprises additional features which will be described in the following with respect to FIGS. 7A and 7B.

FIGS. 7A and 7B show a wheel tray strap receiver 10 and in particular different views showing the construction of the wheel tray strap receiver 10 in greater detail. The wheel tray strap receiver 10 comprises a mounting section 10a comprising an opening in the present case allowing the wheel tray strap receiver 10 to be mounted on a side of a wheel tray 22. Furthermore, the wheel tray strap receiver 10 comprises an engaging section 10b which essentially corresponds to a section in which teeth of the pump buckle 11 are located for an engagement with teeth of the wheel tray strap 9 to be inserted into the wheel tray strap receiver 10. Furthermore, the wheel tray strap receiver 10 comprises a guiding portion 10c which is realized by providing an insertion slot 10e into which the wheel tray strap 9 is insertable. The insertion slot 10e is constructed using a bridging portion 10d extending from one side of the wheel tray strap receiver 10 to its other side and extending towards the portion of the pump buckle 11 comprising the teeth for engagement with the wheel tray strap 9. The bridging section 10g restricts a bendability of the strap 9 towards the toothed portion of the pump buckle 11 thereby effectively preventing an engagement between the teeth of the pump buckle 11 and the teeth of the strap 9 in case the pump buckle 11 is pushed in order to release the strap. More precisely, if the pump buckle 11 is pushed, the toothed portion of the pump buckle 11 is moved away from a base portion 10g of the strap receiving member 10 in order to enlarge the gap between the teeth of the pump buckle 11 and the base portion 10g of the wheel tray strap receiver in the engaging section 10b. Accordingly, by providing the guiding portion 10c in the above described way, pulling out the strap 9 from the wheel tray strap receiver 10 is possible without jamming.

As is shown in FIG. 6 as well as in FIGS. 7A and 7B, the wheel tray strap receiver 10 comprises an abutment portion 10f provided on an opposite side of the pump buckle 11. The abutment portion 10f is constructed so as to be able to get in contact with the wheel tray 22 when the wheel tray strap receiver 10 is mounted on the wheel tray 22. Furthermore, the wheel tray strap receiver 10 is constructed such that its body is bendable in a section between the mounting section 10a and the engaging section 10b. The purpose of such a construction is described with respect to FIG. 6. Since the mounting section 10a and the engaging section 10b are flexibly coupled with respect to each other, the wheel tray strap receiver 10 can be deformed allowing a movement of the engaging section 10b about the mounting section 10a. In other words, it is possible to swivel the upper portion of the wheel tray strap receiver 10 towards the right side in FIG. 6 allowing wide wheels to be mounted on the wheel tray 22.

On the other hand, since the wheel tray strap receiver 10 comprises the abutment portion 10f, the above described movement of the wheel tray strap receiver 10 in the opposite direction, that is in the left direction in FIG. 6, is only possible up to a position in which the abutment portion 10f contacts the wheel tray 22. Thus, the abutment portion 10f acts as a stop limiting the movement of the wheel tray strap receiver 10. This configuration has the beneficial effect that a contact between the wheel tray strap receiver 10 and a side portion of the wheels of a bike can be prevented.

It is to be noted that in case the load receptacle 1 is mounted on the above described bike carrier 2 as shown in FIG. 4, the wheel tray strap receiver 10 functions as an available counterpart 4 into which the load receptacle fastening member 3 in the form of an elongate toothed strap can be inserted and tensioned. Although not shown in FIG. 4, it is possible to use the above described locking mechanism 6 in the construction as shown in FIG. 4.

The invention claimed is:
1. A load carrier system, comprising:
  a bike carrier configured to be mounted on a rear mount system of a vehicle; and
  a load receptacle comprising:
    a load receptacle fastening member configured to cooperate with an available counterpart of said bike carrier,
    wherein said load receptacle fastening member includes one of an elongate member and a receiving member of a fastening structure,
    wherein said receiving member is configured to detachably receive said elongate member,
    wherein said available counterpart, in a first configuration, cooperates with a member of the bike carrier before said load receptacle is mounted on said bike carrier, and wherein said available counterpart, in a second configuration, cooperates with said load receptacle fastening member when said load receptacle is mounted on said bike carrier.

2. The load carrier system according to claim 1, further comprising a locking mechanism configured to temporarily prevent detachment of said elongate member from said receiving member.

3. The load carrier system according to claim 1, wherein said load receptacle fastening member is arranged on a back portion of said load receptacle, said back portion facing away from said vehicle when said load receptacle is mounted on said bike carrier.

4. The load carrier system according to claim 1, wherein said load receptacle is one of a basket, a hardshell box, a softcase, or a carrier comprising a hardshell base with a soft upper part.

5. The load carrier system according to claim 1, wherein said receiving member is a strap receiver comprising a pump buckle.

6. The load carrier system according to claim 1, wherein said rear mount system comprises a ball hitch or a fixed attachment point.

7. The load carrier system according to claim 1, further comprising a second load receptacle fastening member.

8. The load carrier system according to claim 1, further comprising at least one load receptacle fastening element arranged on a front portion of said load receptacle facing towards said vehicle.

9. The load carrier system according to claim 8, wherein said load receptacle fastening element comprises a protrusion protruding from a front portion of said load receptacle, said front portion facing towards said vehicle when said load receptacle is mounted on said bike carrier, wherein said protrusion is configured to be inserted into a corresponding recess formed in said bike carrier.

10. The load carrier system according to claim 1, wherein said elongate member comprises a toothed strap.

11. The load carrier system according to claim 10, wherein said toothed strap comprises a synthetic material.

12. The load carrier system according to claim 1, wherein said bike carrier comprises a wheel tray configured to support a wheel of a bike, wherein said bike carrier comprises a wheel securing device comprising a wheel tray strap and a wheel tray strap receiver configured to fix a wheel of a bike on said wheel tray, wherein at least one element of said wheel securing device forms an available counterpart and said load receptacle fastening member is configured to cooperate with at least one of said wheel tray strap and said wheel tray strap receiver.

13. The load carrier system according to claim 12, wherein said wheel tray strap receiver comprises an abutment portion configured to contact said wheel tray on one side allowing a movement of said engaging section towards said wheel tray until said abutment portion contacts said wheel tray and preventing a further movement of said engaging section towards said wheel tray when said abutment portion is in contact with said wheel tray.

14. The load carrier system according to claim 12, wherein said load receptacle comprises a recess for accommodating said wheel tray.

15. The load carrier system according to claim 12, wherein said wheel tray strap receiver comprises a mounting section for mounting said wheel tray strap receiver on one side of a wheel tray and an engaging section into which an end of said wheel tray strap is insertable, said mounting section and said engaging section being flexibly coupled allowing a movement of said engaging section about said mounting section.

16. The load carrier system according to claim 15, wherein said wheel strap receiver further comprises a guiding portion arranged adjacent said engaging section, said guiding portion comprising an insertion slot for inserting and guiding a toothed strap.

17. A load carrier system comprising:
a bike carrier configured to be mounted on a rear mount system of a vehicle; and
a load receptacle comprising:
a load receptacle fastening member configured to cooperate with an available counterpart of said bike carrier,
wherein said load receptacle fastening member includes one of an elongate member and a receiving member of a fastening structure, and
wherein said receiving member is configured to detachably receive said elongate member, and
wherein said bike carrier comprises a wheel tray configured to support a wheel of a bike, wherein said bike carrier comprises a wheel securing device comprising a wheel tray strap and a wheel tray strap receiver configured to fix a wheel of a bike on said wheel tray, wherein at least one element of said wheel securing device forms an available counterpart and said load receptacle fastening member is configured to cooperate with at least one of said wheel tray strap and said wheel tray strap receiver.

18. The load carrier system according to claim 17, wherein said elongate member comprises a toothed strap comprising synthetic material.

19. The load carrier system according to claim 17, wherein said wheel tray strap receiver comprises a mounting section for mounting said wheel tray strap receiver on one side of a wheel tray and an engaging section into which an end of said wheel tray strap is insertable, said mounting section and said engaging section being coupled to allow movement of said engaging section about said mounting section.

20. The load carrier system according to claim 19, wherein said wheel strap receiver further comprises a guiding portion arranged adjacent said engaging section, said guiding portion comprising an insertion slot for inserting and guiding a toothed strap.

21. A load receptacle mountable on a bike carrier fixed to the rear of a vehicle, said load receptacle comprising:
a load receptacle fastening member configured to cooperate with an available counterpart of said bike carrier,
wherein said load receptacle fastening member includes one of an elongate member and a receiving member of a fastening structure,
wherein said receiving member is configured to detachably receive said elongate member,
wherein said load receptacle comprises a recess configured to be coupled to said bike carrier, and wherein said recess is disposed in a bottom of said load receptacle and is configured to be coupled to a wheel tray of said bike carrier.

22. The load receptacle according to claim 21, wherein said recess is configured to accommodate said wheel tray.

23. The load receptacle according to claim 21, further comprising a second recess configured to be coupled to a second wheel tray.

24. A load receptacle mountable on a bike carrier fixed to the rear of a vehicle, said load receptacle comprising:

a load receptacle fastening member configured to cooperate with an available counterpart of said bike carrier,
wherein said load receptacle fastening member includes one of an elongate member and a receiving member of a fastening structure,
wherein said receiving member is configured to detachably receive said elongate member,
a locking mechanism configured to temporarily prevent detachment of said elongate member from said receiving member,
wherein said receiving member is configured to receive said elongate member by passing a portion of said elongate member through said receiving member in an insertion direction, said locking mechanism comprising a stop element non-movably mountable on said elongate member upon passing said elongate member through said receiving member, wherein said stop element is configured to block passing of said elongate member through said receiving member in a direction opposite to said insertion direction, and
wherein said stop element comprises a first portion, a second portion, and a locking element, wherein said first and second portions are hingedly coupled at a first side of said stop element and lockably connectable at a second side of said stop element.

25. The load receptacle according to claim 24, wherein said elongate member comprises a toothed strap, and said stop element is non-movably mountable on a toothed portion of said toothed strap.

26. The load receptacle according to claim 25, wherein said stop element comprises corresponding teeth configured to engage said toothed portion.

* * * * *